United States Patent
Eo et al.

(10) Patent No.: US 10,415,658 B2
(45) Date of Patent: Sep. 17, 2019

(54) APPARATUS FOR AUTO SHIFTING OF VEHICLE

(71) Applicants: Hyundai Motor Company, Seoul (KR); Kia Motors Corporation, Seoul (KR)

(72) Inventors: Soon Ki Eo, Ansan-Si (KR); Yong Uk Shin, Suwon-si (KR); Ma Ru Kang, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 61 days.

(21) Appl. No.: 15/823,135

(22) Filed: Nov. 27, 2017

(65) Prior Publication Data

US 2019/0032731 A1    Jan. 31, 2019

(30) Foreign Application Priority Data

Jul. 28, 2017    (KR) .................. 10-2017-0095974

(51) Int. Cl.
| | |
|---|---|
| *F16D 43/06* | (2006.01) |
| *F16D 23/02* | (2006.01) |
| *F16D 23/14* | (2006.01) |

(52) U.S. Cl.
CPC .............. *F16D 43/06* (2013.01); *F16D 23/02* (2013.01); *F16D 2023/141* (2013.01)

(58) Field of Classification Search
None
See application file for complete search history.

(56) References Cited

U.S. PATENT DOCUMENTS

| | | | | | |
|---|---|---|---|---|---|
| 2,189,748 | A | * | 2/1940 | Wilson | ............... E05B 77/54 180/281 |
| 4,809,823 | A | * | 3/1989 | Fargier | ............... B60T 8/32 188/180 |

FOREIGN PATENT DOCUMENTS

| | | | | | |
|---|---|---|---|---|---|
| FR | | 2545883 A1 | * | 11/1984 | ............. F01B 25/06 |
| JP | | 5909135 B2 | | 4/2016 | |
| KR | 10-1995-0027229 | | | 10/1995 | |
| KR | 10-0580845 B1 | | | 5/2006 | |
| KR | 10-2015-0077732 A | | | 7/2015 | |

\* cited by examiner

*Primary Examiner* — Timothy Hannon
(74) *Attorney, Agent, or Firm* — Morgan, Lewis & Bockius LLP

(57) ABSTRACT

An apparatus for automatic shifting of a vehicle may include a rotation shaft connected to an output shaft to rotate together; first connecting members each having a first end portion to which a first link disposed on the rotation shaft is hinged and a second end portion to which a centrifugal weight is disposed, to pivot about the first end portions by centrifugal force; second connecting members each having a first end portion hinged to the middle portion of the first connecting member and a second end portion hinged to a second link disposed on the rotation shaft; a slider disposed on the rotation shaft to be coupled to any one of the first link and the second link and sliding in an axial direction of the rotation shaft; and a shift fork connected to the slider to engage a synchronizer with a shift stage gear.

7 Claims, 6 Drawing Sheets

APPARATUS FOR AUTO SHIFTING OF VEHICLE

CROSS-REFERENCE(S) TO RELATED APPLICATIONS

The present application claims priority to Korean Patent Application No. 10-2017-0095974, filed on Jul. 28, 2017, the entire contents of which is incorporated herein for all purposes by this reference.

BACKGROUND OF INVENTION

Field of the Invention

The present invention relates to an apparatus for auto shifting of a vehicle, and, more particularly, the present invention relates to an apparatuses for auto shifting of a vehicle which allows for mechanical shifting without separate electrical and electronic control.

Description of Related Art

In general, in a vehicle provided with an automatic transmission, shifting is automatically performed on the basis of a predetermined shifting pattern.

That is, an operation of a plurality of synchronizers is controlled depending on a vehicle speed and a pedal effort of an accelerator pedal on the basis of the shifting pattern to shift into a desired shift gear.

For the provided purpose, however, there is a demand for a vehicle speed detector for detecting a vehicle speed, an APS, and a controller for integrally controlling those synchronizers depending on a shifting pattern on the basis of the data described above.

The information disclosed in this Background of the Invention section is only for enhancement of understanding of the general background of the invention and should not be taken as acknowledgement or any form of suggestion that this information forms the prior art already known to a person skilled in the art.

BRIEF SUMMARY

Various aspects of the present invention are directed to providing an apparatus for auto shifting of a vehicle which allows for automatic shifting through mechanical operation depending on a vehicle speed without electronic control for shifting.

According to an exemplary embodiment of the present invention, there is provided an apparatus for auto shifting of a vehicle, the apparatus including: a rotation shaft connected to an output shaft to rotate together; first connecting members each having a first end portion to which a first link disposed on the rotation shaft is hinged, and a second end portion to which a centrifugal weight is disposed to pivot about the first end portions by centrifugal force depending on a rotation speed of the rotation shaft; second connecting members each having a first end portion hinged to the middle portion of the first connecting member and a second end portion hinged to a second link disposed on the rotation shaft; a slider disposed on the rotation shaft to be coupled to any one of the first link and the second link and sliding in an axial direction of the rotation shaft; and a shift fork connected to the slider to engage a synchronizer with a shift stage gear, depending on the position of the slider.

Any one of the first link and the second link may be coupled to the slider to be slidable in the axial direction of the rotation shaft and the other one may be fixed on the rotation shaft.

The apparatus may further include a compression spring disposed on the rotation shaft and having both end portions fixed to the first link and the second link, respectively, to apply an elastic force.

The apparatus may further include diaphragm springs disposed on the rotation shaft and coupled to the slider to apply an elastic force to a first side or a second side in the axial direction of the rotation shaft, depending on a position of the slider.

The diaphragm springs may change the direction in which the diaphragm springs apply the elastic force when the rotation speed of the rotation shaft reaches a predetermined speed, and the shift fork may be connected to the slider to start engaging the synchronizer with a shift stage gear at the point of time when the direction in which the diaphragm springs apply the elastic force is changed.

The shift fork may be fixed to the slider to slide with the slider.

The shift fork may be disposed to come into contact with an end portion of the slider, so the shift fork may be pushed by movement of the slider and moved perpendicular to the slider to engage the synchronizer with a shift stage gear.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
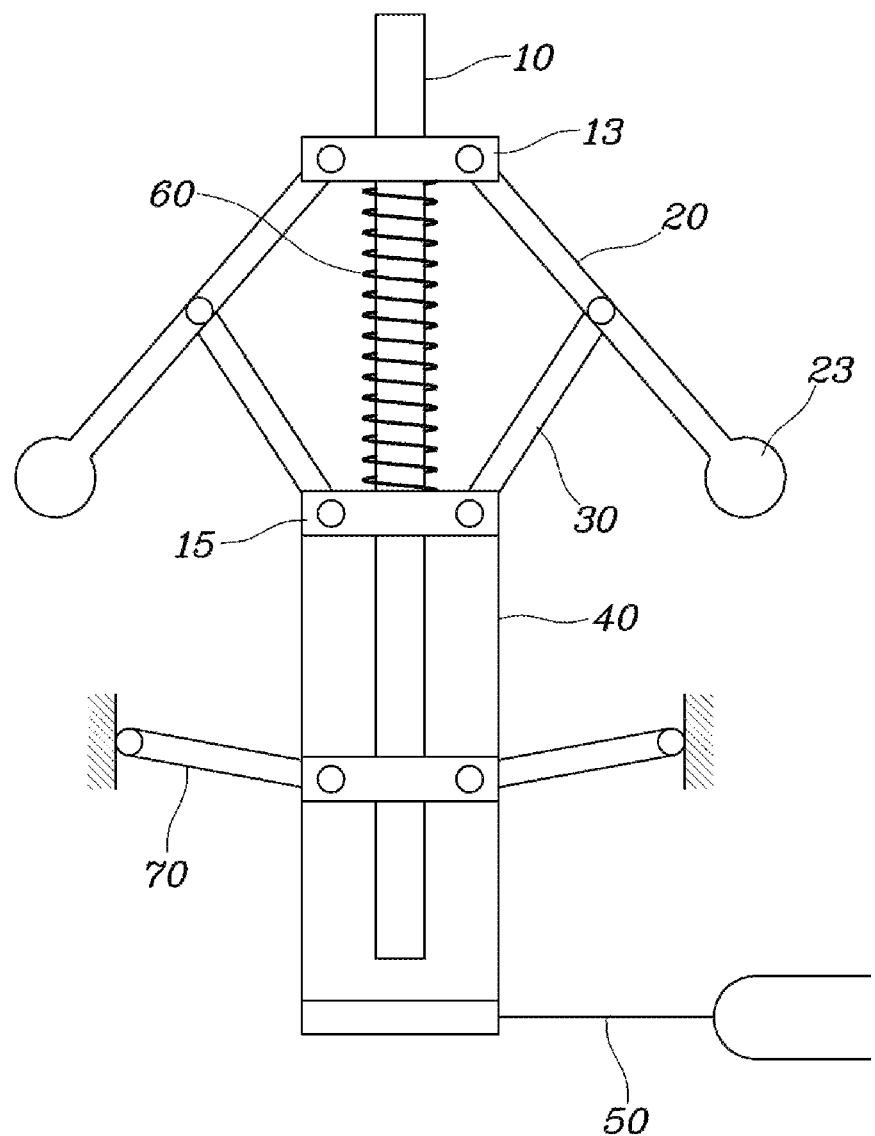
FIG. 1 and FIG. 2 are views showing an operation of an apparatus for auto shifting of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
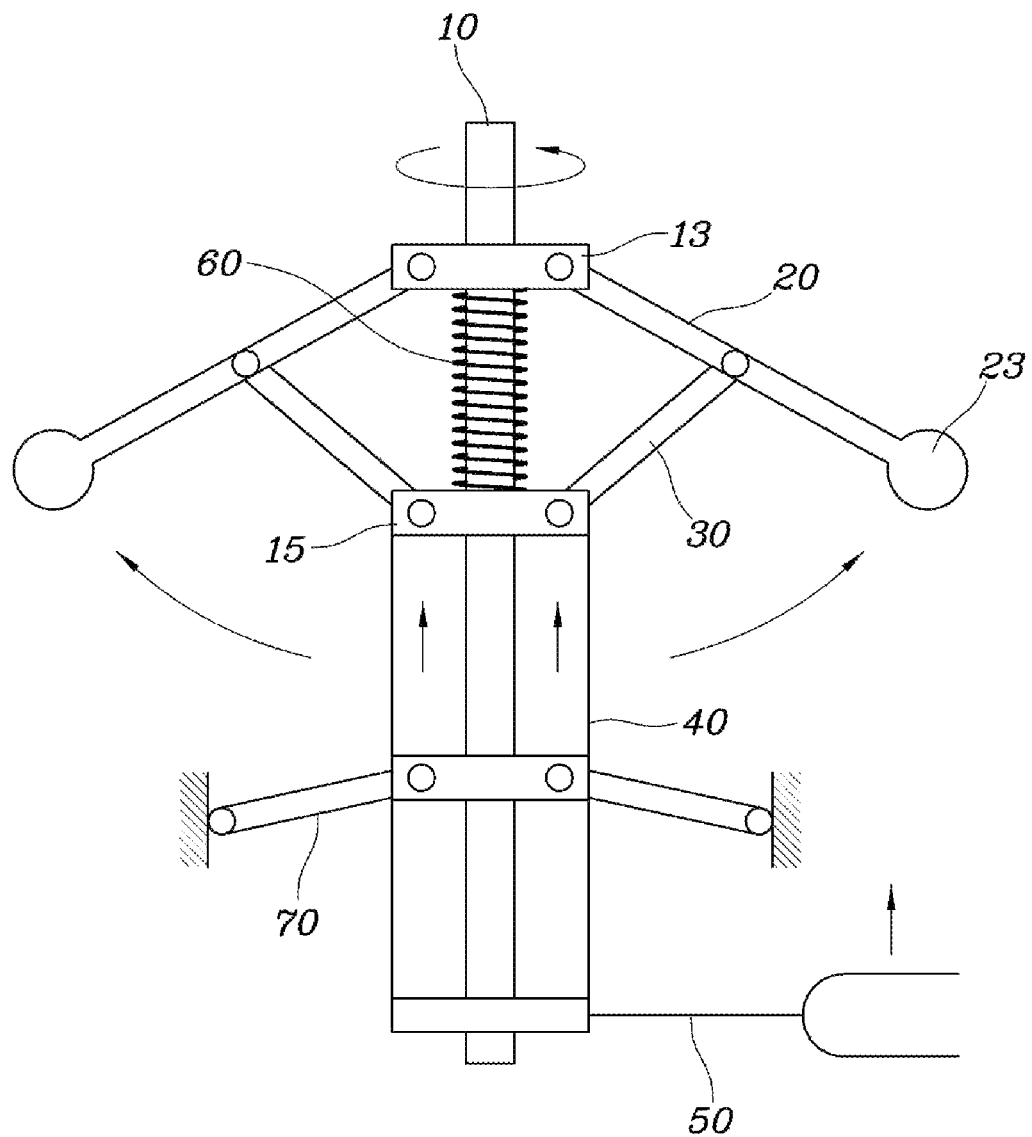
Figure 3:
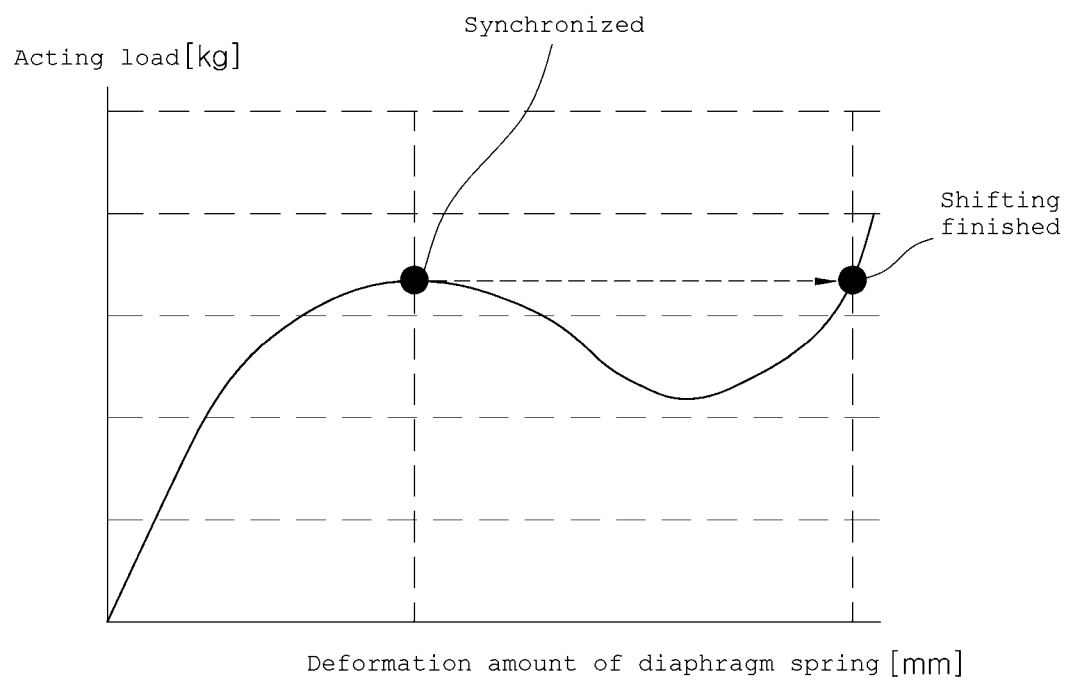
FIG. 3 is a graph showing shifting progress depending on a deformation amount of a diaphragm spring according to an exemplary embodiment of the present invention.
Figure 4:
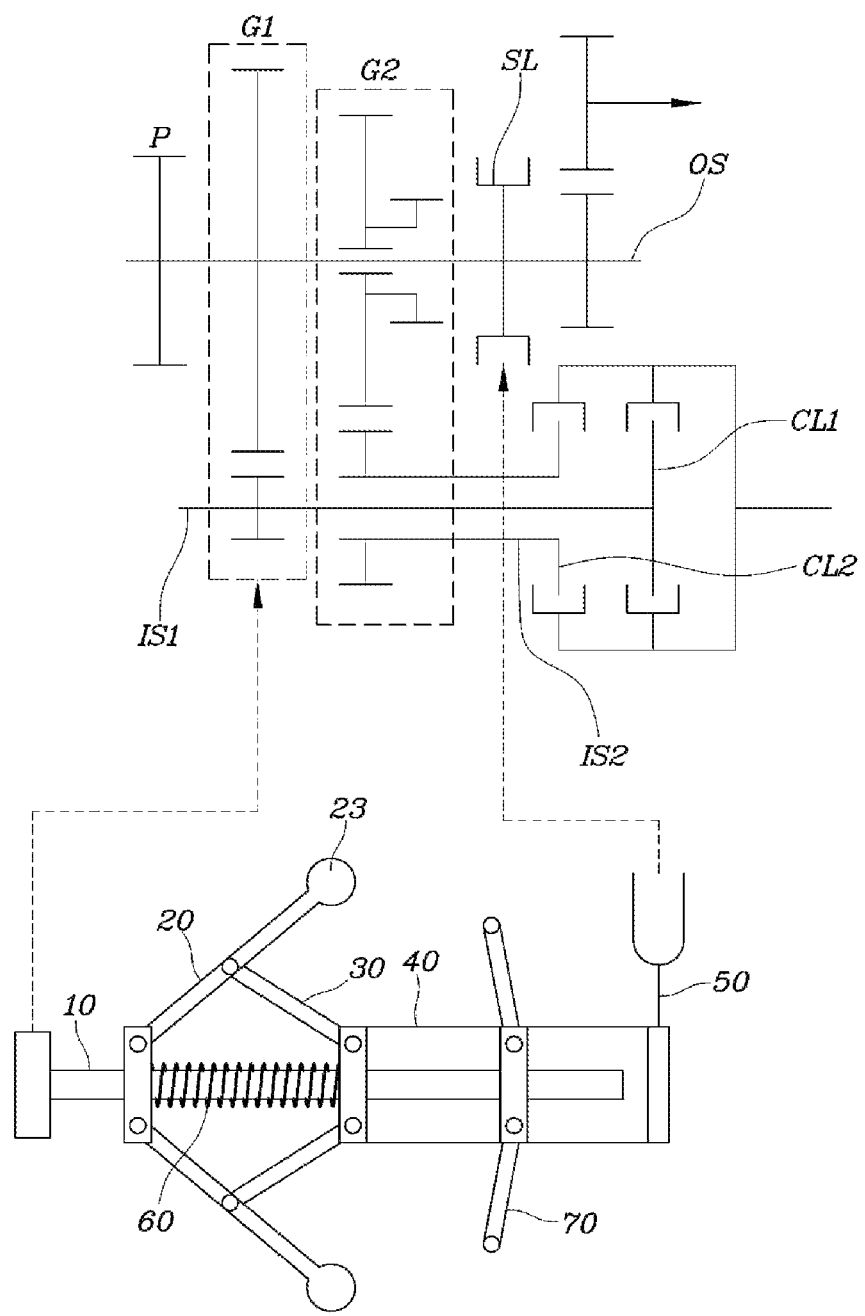
FIG. 4 is a view briefly showing the structure of a transmission provided with the apparatus for auto shifting of a vehicle according to an exemplary embodiment of the present invention.

FIG. 1 and FIG. 2 are views showing the operation of an apparatus for auto shifting of a vehicle according to an exemplary embodiment of the present invention, FIG. 3 is a graph showing a shifting progress depending on a deformation amount of a diaphragm spring according to an exemplary embodiment of the present invention, and FIG. 4 is a view briefly showing the structure of a transmission provided with the apparatus for auto shifting of a vehicle according to an exemplary embodiment of the present invention.

Referring to FIG. 1, FIG. 2, and FIG. 4 first, an apparatus for auto shifting of a vehicle includes a rotation shaft 10 connected to an output shaft OS rotating together; first connecting members 20 each having a first end portion to which a first link 13 disposed on the rotation shaft 10 is hinged, and a second end portion to which a centrifugal weight 23 is disposed to pivot about the first end portions by a centrifugal force depending on a rotation speed of the rotation shaft 10; second connecting members 30 each having a first end portion hinged to the middle portion of the first connecting member 20 and a second end portion hinged to a second link 15 disposed on the rotation shaft 10; a slider 40 disposed on the rotation shaft 10 to be coupled to any one of the first link 13 and the second link 15 and sliding in the axial direction of the rotation shaft 10; and a shift fork 50 connected to the slider 40 to engage a synchronizer SL with a shift stage gear, depending on a position of the slider 40.

That is, according to an exemplary embodiment of the present invention, the shift fork 50 moves the synchronizer SL to engage/disengage the synchronizer SL to/from a shift stage gear G2 and movement of the synchronizer SL by the shift fork 50 depends on the rotation speed of the rotation shaft 10.

More specifically, the first connecting members 20, that pivot about the first link 13, are disposed on the rotation shaft 10 and the centrifugal weights 23 are formed on the first connecting members 20 to maximize the centrifugal force which is generated by the rotation of the rotation shaft 10.

Accordingly, as the rotation speed of the rotation shaft 10 increases, the first connecting members 20 pivot by the stronger centrifugal force wherein the centrifugal weights 23 are moved upwards.

According to an exemplary embodiment of the present invention, the second connecting members 30 are provided to connect the middle portions of the first connecting members 20 and the second link 15 disposed on the rotation shaft 10 to each other, so when the first connecting members 20 pivot, the second connecting members 30 move together with the first connecting member 20.

Any one of the first link 13 and the second link 15 may be coupled to the slider 40 to be slidable in the axial direction of the rotation shaft 10 and the other one may be fixed on the rotation shaft 10.

FIG. 1 and FIG. 2 show an exemplary embodiment in which the first link 13 is fixed to the rotation shaft 10 and the second link 15 is coupled to the slider 40 to be slidable on the rotation shaft 10.

As shown in FIG. 1, when the rotation speed of the rotation shaft 10 is slow, the centrifugal force applied to the first connecting members 20 is small, so the second link 15 remains at a low position while being slid. In the present case, the shift fork 50 connected to the slider 40 keeps a disengagement of the synchronizer from a shift stage gear.

When the rotation speed of the rotation shaft 10 increases, as shown in FIG. 2, the first connecting members 20 pivot about the fixed first link 13 by the centrifugal force and the second connecting members 30 transmit an upward force to the second link 15. Accordingly, the slider 40 and the shift fork 50 coupled to the second link 15 are moved and the synchronizer is engaged with the shift stage gear by the movement of the shift fork 50.

As a result, when the rotation speed of the rotation shaft 10 increases up to a specific speed or more, the fork shift 50 is automatically moved, performing an up-shift, so it is possible to automatically shift without specific electronic control, depending on the vehicle speed.

The slider 40 may include a plurality of rings surrounding the rotation shaft 10 and be able to axially move or be a single cylinder. That is, the shape of the slider 40 can be changed in various ways, depending on designers or vehicles, and may not be limited to a specific shape.

In more detail, the apparatus for auto shifting of a vehicle according to an exemplary embodiment of the present invention may further include a compression spring 60 disposed on the rotation shaft 10 and having both end portions fixed to the first link 13 and the second link 15, respectively, to apply an elastic force.

That is, the compression spring 60 maintains a predetermined gap between the first link 13 and the second link 15, and is compressed by the movement of the slider 40 which is moved when the first connecting members 20 pivot by the centrifugal wherein the shift fork 50 is moved to operate.

Accordingly, the compression spring 60 applies an elastic force between the first link 13 and the second link 15 when the centrifugal force is not applied to the first connecting members 20, preventing shifting into higher gears with a low vehicle speed. Therefore, it is possible to improve reliability in shifting.

Furthermore, the elastic strength of the compression spring 60 can be changed, depending on designers or vehicles, so it is possible to variously determine the point of time of shifting.

The apparatus for auto shifting of a vehicle according to an exemplary embodiment of the present invention may further include diaphragm springs 70 disposed on the rotation shaft 10 and coupled to the slider 40 to apply an elastic force to one side or the other side in the axial direction of the rotation shaft 10, depending on the position of the slider 40.

The diaphragm springs 70 may have a first end portion coupled to the slider 40 and a second end portion fixed to a component including a housing wherein the diaphragm springs 70 rotates with the rotation shaft 10 without axially moving.

That is, the diaphragm springs 70 are coupled to the slider 40. When the rotation speed of the rotation shaft 10 is slow, as shown in FIG. 1, the diaphragm springs 70 can apply an elastic force wherein the slider 40 moves in a direction in which the first connecting members 20 return to an initial state.

When the rotation speed of the rotation shaft 10 increases and the slider 40 is moved to a specific position by the centrifugal force applied to the first connecting members 20, the diaphragm springs 70 are inverted and the direction in which the elastic force is applied is changed as shown in FIG. 2. Accordingly, the acting load required for the slider 40 to move is reduced, so the shift fork 50 moves and can easily engage the synchronizer with a shift stage gear.

The diaphragm springs 70 change the direction in which they apply the elastic force when the rotation speed of the rotation shaft 10 reaches a predetermined speed, and the shift fork 50 can be connected to the slider 50 to start engaging the synchronizer with a shift stage gear at the point of time when the direction in which the diaphragm springs 70 apply the elastic force is changed.

That is, as shown in FIG. 3, the larger the acting load applied to the shift fork 50 by the centrifugal force generated by the rotation shaft 10, the larger the deformation amount of the diaphragm springs 70, and when the deformation amount reaches a specific amount, the diaphragm springs 70 are inverted and the deformation amount to the acting load rapidly increases, wherein shifting is performed. A sleeve of the synchronizer starts to be engaged with a shift stage gear when the diaphragm springs 70 are inverted, so the synchronizer can be more easily engaged with the shift stage gear by the elastic force of the diaphragm springs 70.

In the apparatus for auto shifting of a vehicle according to an exemplary embodiment shown in FIG. 1, FIG. 2, and FIG. 4, the shift fork 50 is fixed to the slider 40 to slide with the slider 40.

Figure 5:
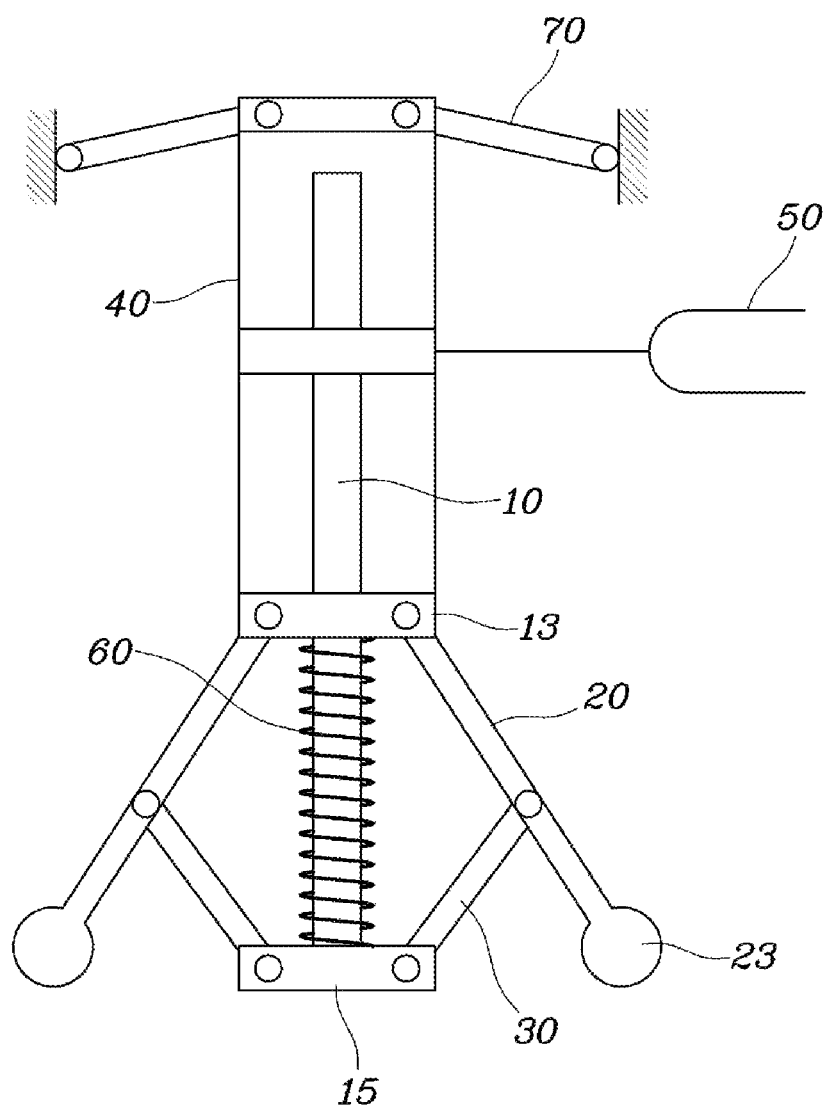
FIG. 5 and FIG. 6 are views showing apparatuses for auto shifting of a vehicle according to further exemplary embodiments of the present invention.
Figure 6:
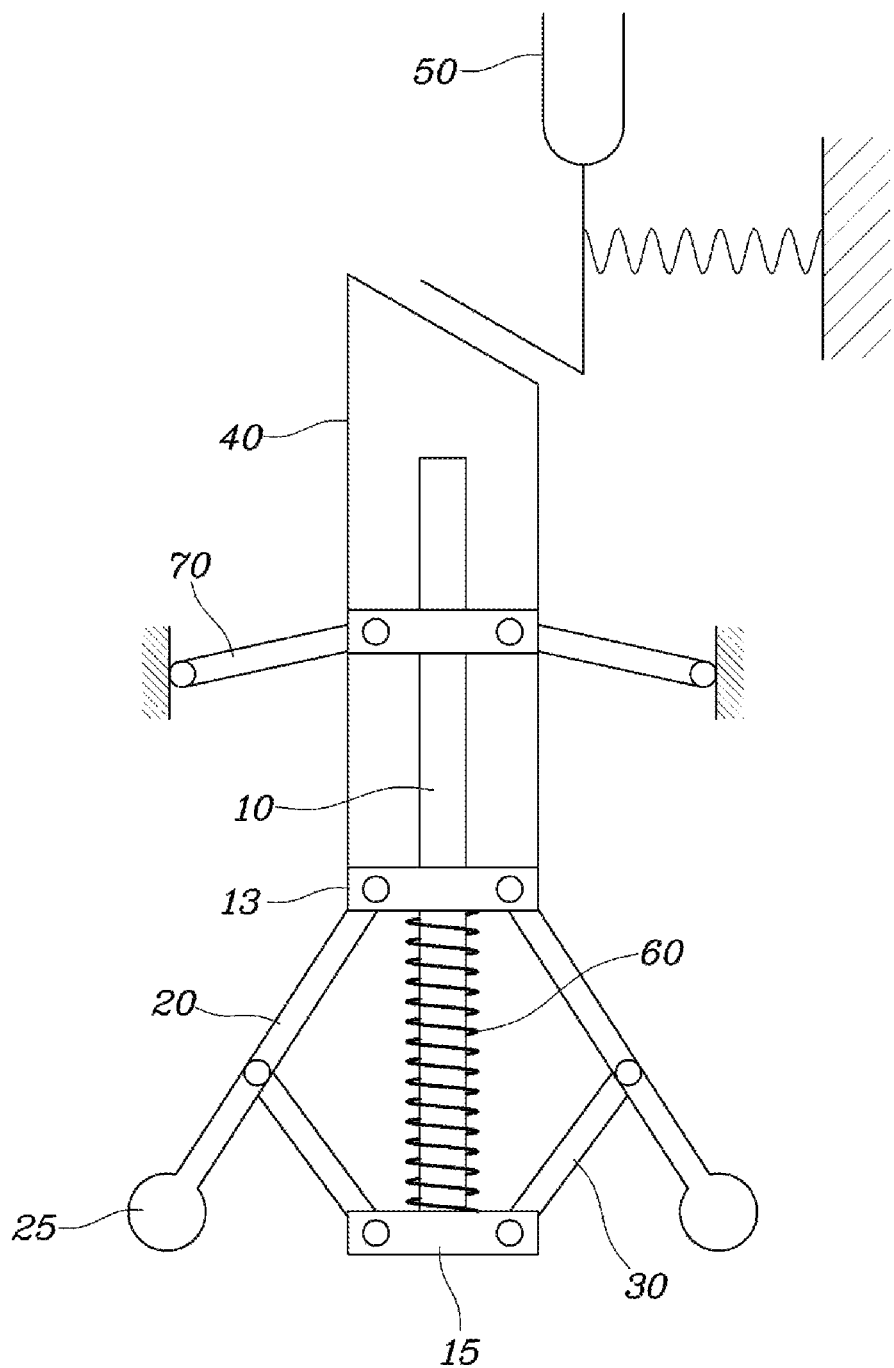

FIG. 5 and FIG. 6 are views showing apparatuses for auto shifting of a vehicle according to further exemplary embodiments of the present invention.

First, in the exemplary embodiment shown in FIG. 5, a first link 13 is coupled to a shift fork 50 to be slidable on a rotation shaft 10 and a second link 15 is fixed to the rotation shaft 10.

Accordingly, when first connecting members 20 pivot by the centrifugal force, the first link 13 is moved upwards on the rotation shaft 10 and the shift fork 50 is also moved, wherein shifting is performed.

In the apparatus for auto shifting of a vehicle according to the exemplary embodiment shown in FIG. 6, a shift fork 50 is disposed to come into contact with an end portion of a slider 40, so the shift fork 50 is pushed by movement of the slider 40 and is moved perpendicular to the slider 40 to engage a synchronizer with a shift stage gear.

That is, when the slider 40 moves and pushes the shift fork 50, the shift fork 50 is moved perpendicular to the slider 40, so the present invention can be applied in various shapes to a vehicle.

Referring to FIG. 4, an apparatus for auto shifting of a vehicle according to an exemplary embodiment of the present invention is applied to a vehicle provided with a Dual Clutch Transmission (DCT), in which a first input shaft IS1 and an output shaft OS may be continuously connected to a first gear set G1, and a second input shaft IS2 and the output shaft OS may be selectively connectable through a second gear set G2, depending on operation of a synchronizer SL. The first shaft IS1 and the second input shaft IS2 are selectively connectable to an engine or a motor by a first clutch CL1 and a second clutch CL2, respectively.

In the present configuration, a shift fork 50 can engage the synchronizer SL with a driven gear of the second gear set S2, depending on the rotation speed of a rotation shaft 10, by engaging with the synchronizer SL. The driven gear of the second gear set G2 is set as a shift stage gear According to the apparatuses for auto shifting of a vehicle having the structures described above, it is possible to automatically mechanically shift, depending on a vehicle speed, even without using separate controllers.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

Although the present invention was described with reference to specific exemplary embodiments shown in the drawings, it is apparent to those skilled in the art that the present invention may be changed and modified in various ways without departing from the scope of the present invention, which is described in the following claims.

What is claimed is:

1. An apparatus for automatic shifting of a vehicle, the apparatus comprising:
   a rotation shaft connected to an output shaft to rotate together;
   first connecting members each having a first end portion to which a first link disposed on the rotation shaft is hinged and a second end portion to which a centrifugal weight is disposed, to pivot about the first end portions by centrifugal force depending on a rotation speed of the rotation shaft;
   second connecting members each having a first end portion hinged to a middle portion of the first connecting member and a second end portion hinged to a second link disposed on the rotation shaft;
   a slider disposed on the rotation shaft to be coupled to one of the first link and the second link and sliding in an axial direction of the rotation shaft; and
   a shift fork connected to the slider to engage a synchronizer with a shift stage gear, depending on a position of the slider.

2. The apparatus of claim 1, wherein the one of the first link and the second link that is coupled to the slider slides in the axial direction of the rotation shaft and the other of the first link and the second link is fixed on the rotation shaft.

3. The apparatus of claim 1, further including a compression elastic member disposed on the rotation shaft and having first and second end portions fixed to the first link and the second link, respectively, to apply a first elastic force.

4. The apparatus of claim 3, further including diaphragm elastic members disposed on the rotation shaft and coupled to the slider to apply a second elastic force to a first side or a second side in the axial direction of the rotation shaft, depending on the position of the slider.

5. The apparatus of claim 4, wherein the diaphragm elastic members change a direction in which the diaphragm elastic members apply the elastic force when the rotation speed of the rotation shaft reaches a predetermined speed, and
   the shift fork is connected to the slider to start engaging the synchronizer with the shift stage gear at a point of time when the direction in which the diaphragm elastic members apply the elastic force is changed.

6. The apparatus of claim 1, wherein the shift fork is fixed to the slider to slide with the slider.

7. The apparatus of claim 1, wherein the shift fork is disposed to contact with an end portion of the slider, so the shift fork is pushed by a movement of the slider and is moved perpendicular to the slider to engage the synchronizer with the shift stage gear.

* * * * *